(12) United States Patent
Barrios et al.

(10) Patent No.: US 10,294,394 B2
(45) Date of Patent: May 21, 2019

(54) PRESSURE SENSITIVE ADHESIVE TAPE WITH MICROSTRUCTURED ELASTOMERIC CORE

(71) Applicant: 3M INNOVATIVE PROPERTIES COMPANY, St. Paul, MN (US)

(72) Inventors: Carlos A. Barrios, Woodbury, MN (US); Michael Benton Free, St. Paul, MN (US); Jason D. Clapper, Lino Lakes, MN (US); Robert M. Jennings, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/308,935

(22) PCT Filed: May 1, 2015

(86) PCT No.: PCT/US2015/028787
§ 371 (c)(1),
(2) Date: Nov. 4, 2016

(87) PCT Pub. No.: WO2015/171456
PCT Pub. Date: Nov. 12, 2015

(65) Prior Publication Data
US 2017/0073550 A1    Mar. 16, 2017

Related U.S. Application Data

(60) Provisional application No. 61/990,181, filed on May 8, 2014.

(51) Int. Cl.
| | | |
|---|---|---|
| C09J 7/29 | (2018.01) | |
| C09J 7/38 | (2018.01) | |
| C09J 7/24 | (2018.01) | |

(52) U.S. Cl.
CPC ............... *C09J 7/29* (2018.01); *C09J 7/241* (2018.01); *C09J 7/38* (2018.01); *C09J 2201/122* (2013.01);
(Continued)

(58) Field of Classification Search
None
See application file for complete search history.

(56) References Cited

U.S. PATENT DOCUMENTS

| 2,956,904 A | 10/1960 | Hendricks |
| 3,658,740 A | 4/1972 | Marrs et al. |

(Continued)

FOREIGN PATENT DOCUMENTS

| WO | WO 93/03107 | 2/1993 |
| WO | WO 93/05123 | 3/1993 |

(Continued)

OTHER PUBLICATIONS

SATAS, Handbook of Pressure-Sensitive Adhesive Technology, (1989), pp. 171-203.

(Continued)

*Primary Examiner* — Frank D Ducheneaux
(74) *Attorney, Agent, or Firm* — Jean A. Lown; Lance L. Vietzke

(57) ABSTRACT

Multilayer adhesive tapes including at least one microstructured elastomeric layer and at least one layer of a pressure sensitive adhesive disposed on the microstructured elastomeric layer, and articles that include such multilayer adhesive tapes.

12 Claims, 4 Drawing Sheets

(52) U.S. Cl.
CPC ...... *C09J 2201/128* (2013.01); *C09J 2201/16* (2013.01); *C09J 2201/606* (2013.01); *C09J 2483/00* (2013.01)

(56) References Cited

U.S. PATENT DOCUMENTS

| | | | |
|---|---|---|---|
| 4,397,905 A | 8/1983 | Dettmer et al. | |
| 4,472,480 A | 9/1984 | Olson | |
| 4,567,073 A | 1/1986 | Larson et al. | |
| 4,614,667 A | 9/1986 | Larson et al. | |
| 4,895,428 A | 1/1990 | Nelson et al. | |
| 5,017,255 A | 5/1991 | Calhoun et al. | |
| 5,138,488 A | 8/1992 | Szczech | |
| 5,141,790 A | 8/1992 | Calhoun et al. | |
| 5,219,655 A | 6/1993 | Calhoun et al. | |
| 5,328,534 A | 7/1994 | Calhoun et al. | |
| 5,354,597 A | 10/1994 | Capik et al. | |
| 5,362,516 A | 11/1994 | Wilson et al. | |
| 6,576,933 B2 | 6/2003 | Sugawara et al. | |
| 6,632,872 B1 | 10/2003 | Pellerite et al. | |
| 6,638,602 B2 * | 10/2003 | Itada | C09J 7/22 428/172 |
| 6,843,571 B2 | 1/2005 | Sewall et al. | |
| 6,858,253 B2 | 2/2005 | Williams et al. | |
| 7,050,227 B2 | 5/2006 | Olofson et al. | |
| 7,176,897 B2 | 2/2007 | Roberts | |
| 7,371,464 B2 | 5/2008 | Sherman et al. | |
| 7,730,402 B2 | 6/2010 | Song | |
| 8,252,407 B2 | 8/2012 | Hannington | |
| 8,305,744 B2 | 11/2012 | Shedletsky et al. | |
| 8,334,037 B2 * | 12/2012 | Sheridan | B32B 27/00 156/289 |
| 2002/0149571 A1 | 10/2002 | Roberts | |
| 2005/0118352 A1 | 6/2005 | Suwa | |
| 2007/0039271 A1 | 2/2007 | Fleming et al. | |
| 2009/0053493 A1 | 2/2009 | Creel et al. | |
| 2013/0011608 A1 | 1/2013 | Wolk et al. | |
| 2013/0018489 A1 | 1/2013 | Grunthaner et al. | |
| 2013/0096849 A1 | 4/2013 | Campbell et al. | |
| 2013/0136874 A1 | 5/2013 | Xia et al. | |
| 2014/0050930 A1 | 2/2014 | Das et al. | |
| 2014/0091336 A1 | 4/2014 | Sanford et al. | |

FOREIGN PATENT DOCUMENTS

| | | |
|---|---|---|
| WO | WO 96/10614 | 4/1996 |
| WO | WO 96/20984 | 7/1996 |
| WO | WO 97/13633 | 4/1997 |
| WO | WO 97/18276 | 5/1997 |
| WO | WO 97/46631 | 12/1997 |
| WO | WO 98/29516 | 7/1998 |
| WO | WO 2009/086056 | 7/2009 |
| WO | WO 2011/135171 | 11/2011 |
| WO | WO 2012/082536 | 6/2012 |
| WO | WO 2013/155362 | 10/2013 |

OTHER PUBLICATIONS

International Search Report for the PCT International Application No. PCT/US2015/028787, dated Aug. 31, 2015, 4 pages.

* cited by examiner

PRESSURE SENSITIVE ADHESIVE TAPE WITH MICROSTRUCTURED ELASTOMERIC CORE

CROSS REFERENCE TO RELATED APPLICATIONS

This application is a national stage filing under 35 U.S.C. 371 of PCT/US2015/028787, filed May 1, 2015, which claims the benefit of U.S. Provisional Application No. 61/990,181, filed May 8, 2014, the disclosures of which are incorporated by reference in their entireties herein.

BACKGROUND

A touch screen offers a simple, intuitive interface to a computer or other data processing device. Rather than using a keyboard to type in data, a user can transfer information through a touch screen by touching an icon or by writing or drawing on a screen. Touch screens are used in a variety of information processing applications. Transparent touch screens are particularly useful for applications such as cell phones, and handheld or laptop computers.

Various methods have been used to determine touch location, including capacitive, resistive, acoustic and infrared techniques. Touch location may also be determined by sensing the force of the touch through force sensors coupled to a touch surface. Touch screens that operate by sensing touch force have several advantages over other technologies mentioned above. First, force sensors do not require the touch surface to be composed of special materials that may inhibit optical transmission through the touch surface, as in a resistive touch sensor. Further, force sensors do not rely on a lossy electrical connection to ground, as is required by a capacitive touch screen, and can be operated by a finger touch, gloved hand, fingernail or other nonconductive touch instrument. Unlike surface acoustic wave technology, force sensors are relatively immune to accumulations of dirt, dust, or liquids on the touch surface. Finally, a force sensor is less likely to detect a close encounter with the touch surface as an actual touch, which is a common problem with infrared touch screens.

Force based touch screens are potentially prone to errors in reported touch location from a number of sources. A force responsive touch signal produced by touch screen force sensors may be affected by a variety of static and dynamic factors in addition to the touch force. These factors may be considered noise sources with respect to the touch signal. Noise may be introduced through the touch screen electronics, or it may be mechanical in nature. Electrical noise may be introduced, for example, in the touch sensing, amplification, data conversion or signal processing stages. Mechanical noise may arise from torsion of the touch screen, movement of the touch screen device, vibration of the touch screen, and other transient factors. The touch screen force sensors may be affected by the weight of the touch surface and preloading forces applied to the force sensors during manufacture. In addition, noise may be introduced by the touch itself.

The touch force typically changes rapidly throughout the duration of a touch. A touch in a single location produces a touch force signal that increases in magnitude as the touch is applied and then decreases in magnitude as the touch is removed. The touch may also be moved across the surface of the touch screen, generating a changing signal at each force sensor. Accurate determination of the touch location requires analysis of touch force signals generated by the touch force, as well as elimination of the static and dynamic noise signals affecting the touch screen.

U.S. Pat. No. 7,176,897 describes correction of memory effect errors in force-based touch panel systems.

U.S. Patent Publication No. 2013/0018489 putatively describes combined force and proximity sensing.

SUMMARY

Multilayer adhesive tapes are disclosed herein that include a microstructured elastomeric layer adhesively coupled to a pressure sensitive adhesive. One benefit that arises is that a useful balance of elasticity and adhesion can be achieved in applications of the tape that can include, for example, attachment of a cover glass to the rest of a consumer electronic device.

In one aspect, a multilayer adhesive tape is disclosed, having a core layer comprising an elastomeric material. The core layer has first and second major surfaces that are opposed, parallel, and microstructured. The microstructures define a plurality of recesses on the first and second major surfaces of the core layer. First and second layers of pressure sensitive adhesive are disposed on the first and second major surfaces of the core layer, respectively, and at least partially fill the plurality of recesses. The first and second layers of pressure sensitive adhesive are adhesively coupled to the core layer. In some embodiments, the core layer further comprises an internal support layer disposed between and parallel to the first and second major surfaces of the core layer.

In another aspect, a multilayer adhesive tape is disclosed, including an elastomeric layer that has first and second major surfaces that are opposed and parallel. The first major surface is microstructured to define a plurality of recesses on the elastomeric layer. A layer of pressure sensitive adhesive is disposed on the first major surface of the elastomeric layer, and at least partially fills the plurality of recesses. The layer of pressure sensitive adhesive is adhesively coupled to the elastomeric layer. In some embodiments, a carrier layer is disposed on the second major surface of the elastomeric layer.

Methods for making multilayer adhesive tape of the present disclosure are described, along with articles that include a multilayer adhesive tape of the present disclosure.

BRIEF DESCRIPTION OF DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
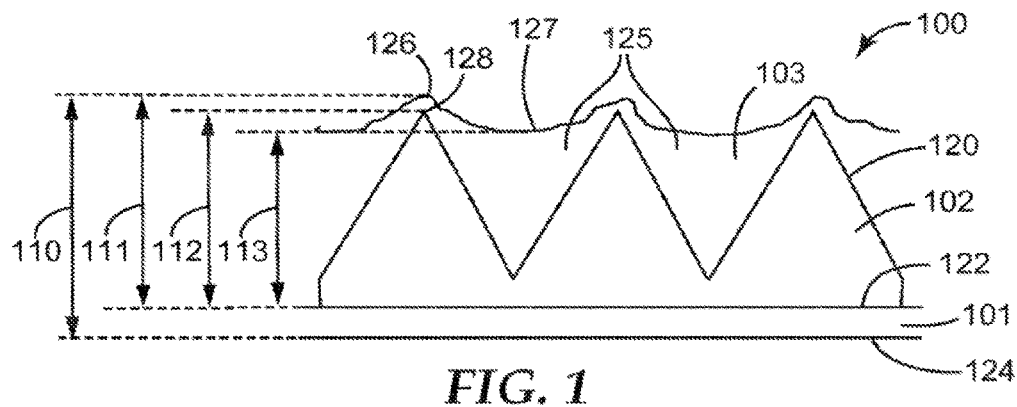
FIG. 1 shows a schematic cross-sectional view of a multilayer adhesive tape of the present disclosure.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise.

As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "actinic radiation" refers to wavelengths of radiation that can crosslink or cure polymers and can include ultraviolet, visible, and infrared wavelengths and can include digital exposures from rastered lasers, thermal digital imaging, and electron beam scanning.

The term "solvent" refers to organic or aqueous liquid that is capable of dissolving, dispersing or suspending the materials described herein (e.g., organosilicon compounds, nanoparticles, polymers, sacrificial materials, etc.).

The term "nanostructures" refers to features that range from about 1 nm to about 2000 nm in their longest dimension and includes microstructures.

The terms "nanostructure" or "nanostructures" refers to structures having at least one dimension (e.g., height, length, width, or diameter) of less than 2 micrometers and more preferably less than one micrometer. Nanostructure includes, but is not necessarily limited to, particles and engineered features. The particles and engineered features can have, for example, a regular or irregular shape. Such particles are also referred to as nanoparticles. The term "nanostructured" refers to a material or layer having nanostructures.

The terms "microstructure" or "microstructures" refers to structures having at least one dimension (e.g., height, length, width, or diameter) of greater than 1 micron and less than 2 millimeters. The term "microstructured" refers to a material or layer having microstructures.

The term "structured surface" refers to a surface that includes periodic, quasi-periodic or random engineered microstructures, nanostructures, and/or hierarchical structures that can be in a regular pattern or random across the surface.

The term "resilient" refers to the capability of a system to withstand shock without permanent deformation or rupture.

The term "resilience" refers to the capability of a strained body to recover its size and shape after deformation caused especially by compressive or shear stress.

The term "tape" refers to an article that comprises an adhesive and a backing

The term "change in shear modulus" refers to shear modulus at 0.1 seconds minus the shear modulus at 5 seconds, divided by the shear modulus at 0.1 seconds.

The term "creep resistance" refers to a material's ability to resist any kind of distortion when under a load over a period of time.

The term "creep recovery" (i.e., "elastic recovery") refers to the time-dependent decrease in strain in a solid, following the removal of force, referenced to the undeformed deformation state before it was loaded.

The term "elastomer" is defined as a material composed of long chain-like molecules capable of recovering to its original size/shape after being stretched or compressed by an external mechanical stress. With the application of force, the polymer molecules straighten out in the direction in which they are being pulled. Upon release, the molecules spontaneously return to their normal compact configuration.

The term "adhesive" refers to any substance applied to two or more surfaces that binds them together and resists separation.

The term "substrate" refers to the material that the tape binds to during use.

Users of pressure-sensitive adhesive tape have frequently sought a product which possesses the combined characteristics of (1) good adhesion to irregular substrates and (2)

good resistance to failure when subject to shearing forces after application. These two desiderata are essentially mutually exclusive, since a soft adhesive is required for conformability but a hard, or firm, adhesive is required for good shear properties. Thus, while adhesives possessing intermediate properties have been made (cf., e.g., U.S. Pat. No. 2,956,904, which teaches the use of an electron beam to crosslink an adhesive, and U.S. Pat. No. 3,658,740 which describes the blending of a tackifier with two types of rubbery copolymer), it has generally been considered impossible to obtain a tape in which the adhesive simultaneously possesses both good conformability and good shear properties.

Tapes made in accordance with the invention thus find utility in a wide variety of mounting, fastening, laminating and other applications.

FIG. 1 shows a schematic cross-sectional view of an exemplary embodiment of a multilayer adhesive tape 100 of the present disclosure, having a carrier layer 101, a structured film layer 102, and a pressure sensitive ("PSA") layer 103. Structured film layer 102 is an elastomeric layer. Structured film layer 102 has first and second major surfaces 120 and 122, respectively. First major surface 120 is microstructured to define a plurality of recesses 125 on first major surface 120. PSA layer 103 is disposed on first major surface 120 of structured film layer 102, and at least partially fills plurality of recesses 125. In some embodiments, carrier layer 101 need not be present. In some further embodiments, multilayer adhesive tape 100 can further include a release liner (not shown) disposed on PSA layer 103.

Referring again to FIG. 1, several height dimensions are called out for multilayer adhesive tape 100. A "total construction height" 110 refers to a distance from an outermost surface 124 of carrier layer 101 to a maximal PSA surface level 126. A "maximum PSA height" 111 refers to a distance from second major surface 122 to maximal PSA surface level 126. A "structured layer height" 112 refers to a distance from second major surface 122 to maximal structure surface level 128. A "minimum PSA height" 113 refers to a distance from second major surface 122 to minimum PSA surface level 127.

In some other embodiments (not shown) a multilayer adhesive tape of the present disclosure can include features of multilayer adhesive tape 100, except that carrier layer 101 need not be present.

Figure 2:
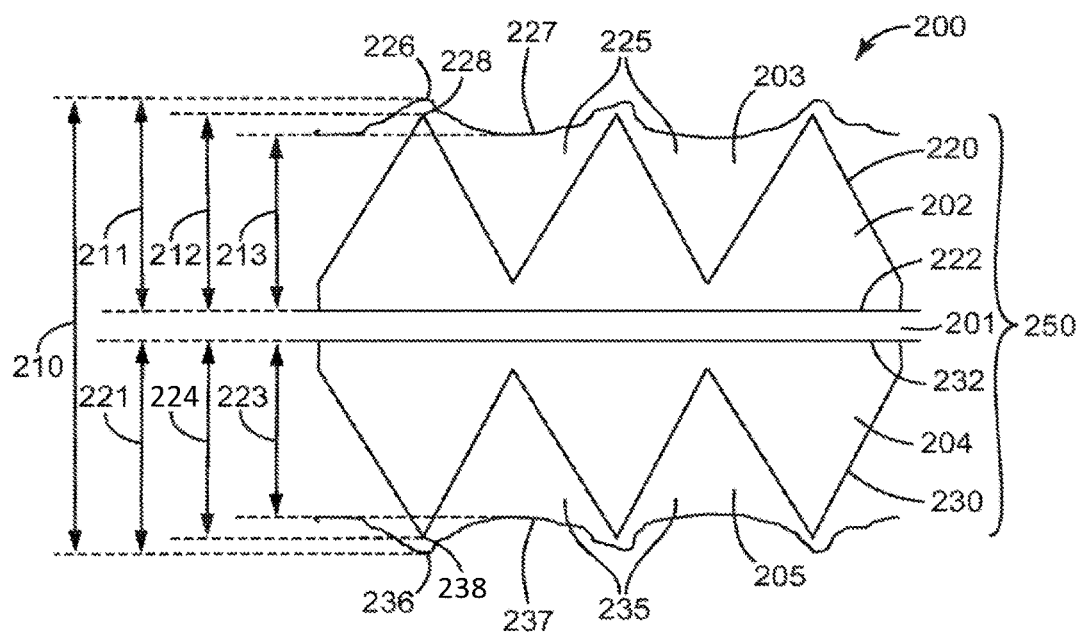
FIG. 2 shows a schematic cross-sectional view of a multilayer adhesive tape of the present disclosure.

FIG. 2 shows a schematic cross-sectional view of an exemplary embodiment of a multilayer adhesive tape 200 of the present disclosure, having a core layer 250 that includes internal support layer (i.e., "support layer") 201, first major surface 220, and an opposed, parallel second major surface 230. In the embodiment shown, core 250 is a multilayer construct having a first structured film layer 202 that includes first major surface 220, and a second structured film layer 204 that includes second major surface 230, with internal support layer 201 disposed between first and second structured film layers 202 and 204. First and second structured film layers 202 and 204 are elastomeric layers. First and second major surfaces 220 and 230 are microstructured to define a plurality of recesses, including pluralities of recesses 225 and 235, respectively. First and second layers of PSA 203 and 205 are disposed on first and second major surfaces 220 and 230, respectively, and at least partially fill pluralities of recesses 225 and 235.

Taken together, first structured film layer 202 and first PSA layer 203 form a "Side A" of multilayer adhesive tape 200, and second structured film 204 and second PSA layer 205 form a "Side B" of multilayer adhesive tape 200.

Several height dimensions are called out for multilayer adhesive tape 200, with reference to Sides A and B.

A "total construction height" 210 refers to a distance from maximal PSA surface level 226 to maximal PSA surface level 236.

A "Side A maximum PSA height" 211 refers to a distance from first structured film innermost surface 222 to maximal PSA surface level 226. Similarly, a "Side B maximum PSA height" 221 refers to a distance from second structured film innermost surface 232 to maximal PSA surface level 236.

A "Side A structure height" 212 refers to a distance from first structured film innermost surface 222 to maximal structure surface level 228. Similarly, a "Side B structure height" 224 refers to a distance from first structured film innermost surface 232 to maximal structure surface level 238.

A "Side A minimum PSA height" 213 refers to a distance from first structured film innermost surface 222 to minimum PSA surface level 227. Similarly, a "Side B minimum PSA height" 223 refers to a distance from first structured film innermost surface 232 to minimum PSA surface level 237.

In some other embodiments (not shown) a multilayer adhesive tape of the present disclosure can include features of multilayer adhesive tape 200, except that internal support layer 201 need not be present (i.e., thickness of internal support layer is 0 micrometer), and core layer 250 can be a unitary structure having first and second major surfaces 220 and 230 and the other features of multilayer adhesive tape 200.

In some further embodiments, multilayer adhesive tape 200 further comprises a release liner (not shown) disposed on first PSA layer 203, second PSA layer 205, or both.

Figure 3:
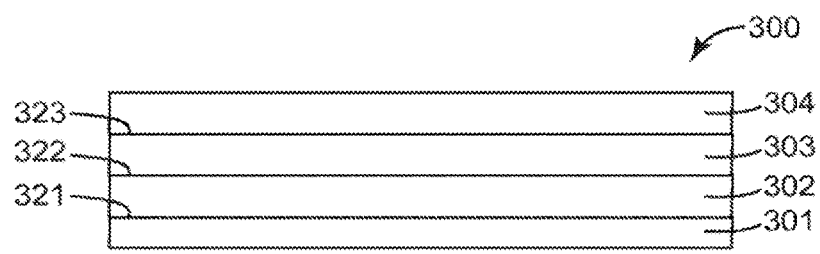
FIG. 3 shows a schematic cross-sectional view of a multilayer adhesive tape of the present disclosure.

FIG. 3 shows schematic cross-sectional view of an exemplary embodiment of a multilayer adhesive tape 300 of the present disclosure, including a microstructured layer (i.e., a microstructured film layer) 302 having a layer of PSA 303 disposed thereon at a structured interface 322 (i.e., the surface of microstructured layer 302 facing layer of PSA 303 is microstructured). Multilayer adhesive tape 300 further includes an optional carrier layer 301 disposed on microstructured layer 302 at carrier/structured film layer interface 321. In the embodiment shown, multilayer adhesive tape 300 further includes a release liner 304 disposed on layer of PSA 303 at releasable interface 323.

Structured Film Layer

Useful polymers that may be used as a structured film layer polymer include one or more polymers selected from the group consisting of styrene acrylonitrile copolymers; styrene (meth)acrylate copolymers; polymethylmethacrylate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; and copolymers of acrylonitrile, butadiene, and styrene. Particularly useful polymers that may be used as the first extrudable polymer include styrene acrylonitrile copolymers known as TYRIL copolymers available from Dow Chemical; examples include TYRIL 880 and 125. Other particularly useful polymers that may be used as the structured film polymer include styrene maleic anhydride copolymer DYLARK 332 and styrene acrylate copolymer NAS 30, both from Nova Chemical. Also useful are polyethylene terephthalate blended with nucleating agents such as magnesium silicate, sodium acetate, or methylenebis(2,4-di-t-butylphenol) acid sodium phosphate, acrylic rubber, butadiene rubber, butyl rubber, chlorobutyl chlorinated polyethylene, chlorosulphonated polyethylene, epichlorhydrin ethylene, acrylic ethylene, propylene rubber, fluoroelastomers, hydrogenated nitrile rubber, isoprene rubber, natural rubber, nitrile rubber, perfluoro elastomers polychloroprene, polynorbornene rubber, polysulphide rubber, polyurethane rubber, silicone (and fluorosilicone) rubber, styrene butadiene rubber and tetra-flouroethylene/propylene. General categories of exemplary materials which may be suitable for use in the structured film layer e.g. elastomeric polymers based on natural rubber; synthetic rubber (e.g., butyl rubber, nitrile rubber, polysulfide rubber); block copolymers; the reaction product of acrylate and/or methacrylate materials; and so on. (As used herein, terms such as (meth)acrylate, (meth(acrylic), and the like, refer to both acrylic/acrylate, and methacrylic/methacrylate, monomer, oligomers, and polymers derived therefrom). Specific polymers and/or copolymers and/or monomer units suitable for inclusion in such an elastomeric polymer may include, but are not limited to: polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers, styrene polymers, poly-alpha-olefins, amorphous polyolefins, ethylene vinyl acetates, polyurethanes, silicone-urea polymers, polyvinylpyrrolidones, and any combinations (blends, copolymers, etc.) thereof. Examples of suitable (meth)acrylic materials include polymers of alkyl acrylate or methacrylate monomers such as e.g. methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, acrylonitrile, and combinations thereof. Examples of suitable commercially available block copolymers include those available under the trade designation KRATON from Kraton Polymers, Houston, Tex. Any of these or other suitable materials may be used in any desired combination. A general description of some useful elastomers may be found in the Encyclopedia of Polymer Science and Engineering, Vol. 13, Wiley-Interscience Publishers (New York, 1988). Additional descriptions of some useful elastomers may be found in the Encyclopedia of Polymer Science and Technology, Vol. 1, Interscience Publishers (New York, 1964).

In some embodiments, the structured film layer in the first and second structured film layers 202 and 204 in multilayer adhesive tape 200 can be of the same composition, or separate structured film layer compositions can be selected for each of first and second structured film layers 202 and 204.

Structures

The structures in the structured film can be one-dimensional (1D), meaning the structures are periodic in only one dimension, that is, nearest-neighbor features are spaced equally in one direction along the surface, but not along the orthogonal direction. One-dimensional structures include, for example, continuous or elongated prisms or ridges, linear gratings, cylindrical or curved lens-shaped features, and random structures including chaos structures, and the like.

The structures can also be two-dimensional (2D), meaning they are periodic in two dimensions, that is, nearest neighbor features are spaced equally in two different directions along the surface. In the case of 2D structures, the spacing in both directions may be different. Two-dimensional structures include, for example, diffractive optical structures, pyramids, trapezoids, bullets, round or square shaped posts, photonic crystal structures, spherical or curved lenses, curved sided cone structures, interlocking structures, and the like.

The term "microstructure", used herein in the context of an article having a surface bearing microstructure, means the configuration of a surface which depicts or characterizes the predetermined desired utilitarian purpose or function of said article. Discontinuities, such as projections and indentations in the surface will deviate in profile from the average profile or center line drawn through the microstructure such that the sum of the areas embraced by the surface profile above the line is equal to the sum of those areas below the line, said line being essentially parallel to the nominal surface (bearing the microstructure) of the article. The heights of said deviations will be ±0.005 micrometer to ±750 micrometers through a representative characteristic length of the surface (e.g., 1 centimeter to 30 centimeters). Said average profile, or center line, can be plano, concave, convex, aspheric, or combinations thereof. Articles where said deviations are of low order (e.g., from ±0.005 micrometer to ±0.1 micrometer or, preferably, from ±0.005 micrometer to ±0.05 micrometers) and said deviations are of infrequent or minimal occurrence (i.e., the surface is free of any significant discontinuities), are those where the microstructure-bearing surface is an essentially "flat" or "perfectly smooth" surface, such articles being useful, for example, as precision optical elements or elements with a precision optical interface, such as ophthalmic lenses. Articles where said deviations are of said low order and of frequent occurrence are those, for example, bearing utilitarian discontinuities, as in the case of articles having anti-reflective microstructure. Articles where said deviations are of high order (e.g., from ±0.1 micrometer to ±750 micrometer) and attributable to microstructure comprising a plurality of utilitarian discontinuities which are the same or different and spaced apart or contiguous in a random or ordered manner, are articles such as retroreflective cube-corner sheeting, linear Fresnel lenses, and video discs. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles. In some embodiments, microstructural elements include at least one of cones, diffraction gratings, lenticulars, segments of a sphere, pyramids, cylinders, fresnels, or prisms. It may be necessary or desirable to select a particular oligomeric composition whose shrinkage upon curing does not result in said interfering extraneous discontinuities (e.g., a composition which shrinks only 2% to 6%). The profiles and the dimensions and spacing of said discontinuities are those discernible by an electron microscope at 1000× to 100,000×, or an optical microscope at 10× to 1000×.

The structured film can generally include surface features that are any desirable height, for example heights suitable for optical refractive surfaces, and may range from a few microns to several millimeters in height, such as greater than about 1 micron, or greater than about 10 microns, or greater than about 20 microns, or greater than about 50 microns, or greater than about 100 microns, or even greater than about 1000 microns or more in height.

The structured film can generally include surface features that are any desirable aspect ratio, and may range from 0.2 to greater than 10, such as greater than about 0.2, or greater than about 0.5, or greater than about 0.7, or greater than about 1, or greater than about 5, or greater than about 10. In general, higher aspect ratios (aspect ratios greater than 0.7) are desired for this application.

Method of Structure Fabrication

The structured film layer can be formed through embossing, replication processes, extrusion, reactive extrusion, casting, or surface structuring, for example. It is to be understood that the structured film layer can have a structured surface that may include nanostructures, microstructures, or hierarchical structures. Nanostructures comprise features having at least one dimension (e.g., height, width, or length) less than or equal to one micron. Microstructures comprise features having at least one dimension (e.g., height, width, or length) less than or equal to two millimeters. Hierarchical structures are combinations of nanostructures and microstructures. In some embodiments, the structured film layer can be compatible with patterning, actinic patterning, embossing, extruding, and coextruding.

In some embodiments, the structured film layer includes a curable material that can have a low viscosity during a replication process and then can be quickly cured to form a permanent crosslinked polymeric network "locking in" the replicated structures, microstructures or hierarchical structures. Any photocurable elastomer resins known to those of ordinary skill in the art of polymerization can be used for the structured film layer. The resin used for the structured film layer must be capable, when crosslinked, of adhering to the adhesive layer during the use of the disclosed tapes, or should be compatible with application of a tie layers and the process for applying the tie layer. Additionally, the resins used for the structured film layer preferably are compatible with the application of an adhesion promotion layer, as described elsewhere.

Structured film layers can be formed by depositing a layer of a radiation curable elastomer composition onto one surface of a radiation transmissive support to provide a layer having an exposed surface, contacting a master with a preformed surface bearing a pattern capable of imparting a three-dimensional microstructure of precisely shaped and located interactive functional discontinuities including distal surface portions and adjacent depressed surface portions into the exposed surface of the layer of radiation curable composition on said support under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of support, depositing a layer of curable material onto the support, laminating the curable material against a master and curing the curable material using actinic radiation. The resulting roll of support with a structured film disposed thereon can then be rolled up. This method is disclosed, for example, in U.S. Pat. No. 6,858,253 (Williams et al.).

For extrusion, reactive extrusion or embossed structured film layers, the materials making up the structured film layer can be selected depending on the particular topography of the top structured surface that is to be imparted. In general, the materials are selected such that the structure is fully replicated before the materials solidify. This will depend in part on the temperature at which the material is held during the extrusion process and the temperature of the tool used to impart the top structured surface, as well as on the speed at which extrusion is being carried out. Typically, the extrudable polymer used in the top layer has a Tg of less than about 140° C., or a Tg of from about 85° C. to about 120° C., in order to be amenable to extrusion replication and embossing under most operating conditions. In some embodiments, the structured film layer and the carrier layer can be coextruded at the same time. This embodiment requires at least two layers of coextrusion: a top layer with one polymer and a bottom layer with another polymer. If the top layer comprises a first extrudable polymer, then the first extrudable polymer can have a Tg of less than about 140° C. or a Tg or of from about 85° C. to about 120° C. If the top layer comprises a second extrudable polymer, then the second extrudable polymer, which can function as the carrier layer, has a Tg of less than about 140° C. or a Tg of from about 85° C. to about 120° C. Other properties such as molecular weight and melt viscosity should also be considered and will depend upon the particular polymer or polymers used. The materials used in the structured film layer should also be selected so that they provide good adhesion to the support so that delamination of the two layers is minimized during the lifetime of the adhesive article. In other embodiments, the structured film layer side A, the carrier, and structured film layer side B are coextruded at the same time. This embodiment requires casting tools on both the top and bottom surface of the nip, and requires a first extrudable polymer that creates the structured film layer side A, a second extrudable polymer to form the carrier, and a third extrudable polymer that creates the structured film layer side B. In some cases the second extrudable polymer forming the carrier is the same material as either the first extrudable polymer, the third extrudable polymer, or both. In some embodiments, the first and third extrudable polymers are the same material, in other embodiments they are different materials.

The extruded or coextruded structured film layer can be cast onto a master roll that can impart patterned structure to the structured film layer. Additionally, a structured film layer can be extruded onto the extruded or coextruded carrier layer. In some embodiments, all three layers: structured film side A, carrier, and structured film side B can be coextruded at once.

Pressure Sensitive Adhesive Layer(s)

Multilayer adhesive tapes of the present disclosure include pressure sensitive adhesive layer(s) (e.g., PSA layer 103 of tape 100, and PSA layers 203 and 205 of tape 200). Pressure-sensitive adhesives ("PSAs") are normally tacky at room temperature and can be adhered to a surface by application of, at most, light finger pressure and thus may be distinguished from other types of adhesives that are not pressure-sensitive. A general description of pressure-sensitive adhesives may be found in the Encyclopedia of Polymer Science and Engineering, Vol. 13, Wiley-Interscience Publishers (New York, 1988). Additional description of pressure-sensitive adhesives may be found in the Encyclopedia of Polymer Science and Technology, Vol. 1, Interscience Publishers (New York, 1964). In at least some embodiments, a pressure-sensitive adhesive may meet the Dahlquist criterion described in Handbook of Pressure-Sensitive Adhesive Technology, D. Satas, 2nd ed., page 172 (1989). This criterion defines a pressure-sensitive adhesive as one having a one-second creep compliance of greater than $1\times10-6$ cm2/dyne at its use temperature (for example, at temperatures in a range of from 15° C. to 35° C.). Any suitable pressure-sensitive adhesive of any suitable composition and with any suitable properties may be used for either or both of first and second pressure-sensitive adhesive layers (e.g., PSA layer 203 and/or PSA layer 205 in multilayer adhesive tape 200).

In some embodiments, the PSA in the first and second PSA layers 203 and 205 in multilayer adhesive tape 200 can be of the same composition, or separate PSA compositions can be selected for each of first and second PSA layers 203 and 205.

Silicone-based pressure-sensitive adhesive compositions (for example, a block copolymer with hard segments, or any other type of silicone elastomer) may often include an MQ tackifying resin. Silicone-based adhesives, of any of the above-discussed types and variations, may be provided in any suitable form to be disposed on an elastomeric core or structured film layer to form a multilayer adhesive film of the present disclosure. For example, such an adhesive may be provided in the form of a precursor liquid that is a flowable liquid and that can be deposited onto structured core layer 250 (i.e., onto first and second microstructured layers 220 and 230) to form layers of the precursor liquid, flowing into and at least partially filling plurality of recesses on which precursor can then be transformed into the silicone-based adhesive in its final form. Thus, a precursor flowable liquid might be, for example, a 100% solids mixture suitable for e.g. hot melt coating, or a water-borne emulsion (e.g. latex), or a solution in one or more suitable solvents, as discussed later herein.

Any suitable pressure-sensitive adhesive of any suitable composition and with any suitable properties may be used for either or both of first and second pressure-sensitive adhesives layers. In some embodiments, at least one of first and second PSA layers is a silicone-based pressure-sensitive adhesive. In some embodiments, first PSA layer is a first silicone-based adhesive with a first set of properties, and second PSA layer is a second silicone-based adhesive with a second set of properties (and that may differ in composition from the first adhesive). Such adhesives typically include at least one silicone elastomeric polymer, and that may contain other optional components such as tackifying resins. The silicone elastomeric polymer may be a silicone block copolymer elastomer comprising hard segments that each comprises at least one polar moiety. By a polar moiety is meant a urea linkage, an oxamide linkage, an amide linkage, a urethane linkage, or a urethane-urea linkage. Thus, suitable silicone block copolymer elastomers include for example, urea-based silicone copolymers, oxamide-based silicone copolymers, amide-based silicone copolymers, urethane-based silicone copolymers, and mixtures thereof. Other silicone-based adhesives may be those based e.g. on thermally curable (e.g., platinum-cured, peroxide-cured, moisture-cured silicone polymers, etc.), as are well-known to the skilled artisan. Such silicones may not necessarily comprise any of the above-listed hard segments.

In some embodiments, the PSA material can have a storage modulus of between 10,000 Pa and 200,000 Pa at 25° C.

Example adhesion promoters include, but are not limited to, various silane compounds. Some silane compounds that are suitable for adhesion promoters have amino groups or glycidyl groups that can react with one or more components in the curable composition. One such silane compound is a glycidoxypropyltrimethoxysilane that is commercially available under the trade designation SILANE Z6040 from Dow Corning (Midland, Mich., USA). Other example adhesive promoters include various chelating agents such as those described in U.S. Pat. No. 6,632,872 (Pellerite et al.) and various chelate-modified epoxy compounds such as those available from Adeka Corporation (Tokyo, Japan) under the trade designation EP-49-10N and EP-49-20.

The PSA may be solvent based, solvent free, UV curable, hotmelt, or the like. The PSA may be applied to the structured film layer by any method known to those of ordinary skill in the art of coating, including but not limited to coating, knife coating, die coating, multilayer coating, slide coating, extruding, coextruding, or laminating.

Optional Carrier Layer

The optional support layer (e.g., a support layer 201, or in some other embodiments, a carrier layer 101) can be any suitable film, including, for example, thermally stable flexible films that can provide mechanical support for the other layers. Support layer 201 can be thermally stable above 50° C., or alternatively 70° C., or alternatively above 120° C. One example of support layer 201 is polyethylene terephthalate (PET). In some embodiments, support layer 201 can include paper, release-coated paper, non-wovens, wovens (fabric), metal films, and metal foils.

Various polymeric film substrates comprised of various thermosetting or thermoplastic polymers are suitable for use as the support layer. The support layer may be a single layer or multi-layer film. Illustrative examples of polymers that may be employed as the support layer film include (1) fluorinated polymers such as poly(chlorotrifluoroethylene), poly(tetrafluoroethylene-cohexafluoropropylene), poly(tetrafluoroethylene-co-perfluoro(alkyl)vinylether), poly(vinylidene fluoride-cohexafluoropropylene); (2) ionomeric ethylene copolymers poly(ethylene-co-methacrylic acid) with sodium or zinc ions such as SURLYN-8920 Brand and SURLYN-9910 Brand available from E. I. duPont Nemours, Wilmington, Del.; (3) low density polyethylenes such as low density polyethylene; linear low density polyethylene; and very low density polyethylene; plasticized vinyl halide polymers such as plasticized poly(vinychloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)_n$- where n is 0 to 12, and poly(ethylene-co-vinylacetate) "EVA"; and (5) (e.g.) aliphatic polyurethanes.

The support layer can be an olefinic polymeric material, typically comprising at least 50 wt. % of an alkylene having 2 to 8 carbon atoms with ethylene and propylene being most commonly employed. Other support layers include for example poly(ethylene naphthalate), polycarbonate, poly(meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate (TAC), polystyrene, styrene-acrylonitrile copolymers, cyclic olefin copolymers, epoxies, and the like. In some embodiments, the support substrate can include paper, release-coated paper, non-wovens, wovens (fabric), metal films, and metal foils. The optional carrier layer provides several functions including added handleability in application of the final film and during the manufacturing process, as well as improved die cuttability and slitting, among others. The adhesion of the carrier to the structured film layer must be higher than that of the adhesion of the final tape construction to the substrate, or the tape may fail at the interface between the carrier and the structured film layer during use. The adhesion between these two adjacent layers. Adhesion may be improved by use of adhesion promoters discussed above. The carrier is preferably flexible, and must be able to withstand the processing steps required to make the other layers in the construction with failing. The carrier film must not detract from the creep-resistant properties of the construction. In some cases the carrier film is made of the same material as the structured film layer.

Release Liner

The optional release layer 304 can be a release liner that can protect the structured adhesive article during handling and can be easily removed, when desired, for transfer of the structured adhesive article or part of the structured adhesive article to a substrate. Exemplary liners useful for the disclosed patterned structured tape are disclosed in PCT Pat. Appl. Publ. No. WO 2012/082536 (Baran et al.).

The liner may be flexible or rigid. Preferably, it is flexible. A suitable liner (preferably, a flexible liner) is typically at least 0.5 mil thick, and typically no more than 20 mils thick. The liner may be a backing with a release coating disposed on its first surface. Optionally, a release coating can be disposed on its second surface. If this backing is used in a transfer article that is in the form of a roll, the second release coating has a lower release value than the first release coating. Suitable materials that can function as a rigid liner include metals, metal alloys, metal-matrix composites, metalized plastics, inorganic glasses and vitrified organic resins, formed ceramics, and polymer matrix reinforced composites.

Exemplary liner materials include paper and polymeric materials. For example, flexible backings include densified Kraft paper (such as those commercially available from Loparex North America, Willowbrook, Ill.), poly-coated paper such as polyethylene coated Kraft paper, and polymeric film. Suitable polymeric films include polyester, polycarbonate, polypropylene, polyethylene, cellulose, polyamide, polyimide, polysilicone, polytetrafluoroethylene, polyethylenephthalate, polyvinylchloride, polycarbonate, or combinations thereof. Nonwoven or woven liners may also be useful. Embodiments with a nonwoven or woven liner could incorporate a release coating. CLEARSIL T50 Release liner; silicone coated 2 mil polyester film liner, available from Solutia/CP Films, Martinsville, Va., and LOPAREX 5100 Release Liner, fluorosilicone-coated 2 mil polyester film liner available from Loparex, Hammond, Wis., are examples of useful release liners.

The release coating of the liner may also be a fluorine-containing material, a silicon-containing material, a fluoropolymer, a silicone polymer, or a poly(meth)acrylate ester derived from a monomer comprising an alkyl (meth)acrylate having an alkyl group with 12 to 30 carbon atoms. In one embodiment, the alkyl group can be branched. Illustrative examples of useful fluoropolymers and silicone polymers can be found in U.S. Pat. No. 4,472,480 (Olson), U.S. Pat. Nos. 4,567,073 and 4,614,667 (both Larson et al.). Illustrative examples of a useful poly(meth)acrylate ester can be found in U.S. Pat. Appl. Publ. No. 2005/118352 (Suwa).

Reduction of the adhesion to any layer applied to it can be accomplished by application of a release coating. One method of applying a release coating to the surface of the support substrate is with plasma deposition. An oligomer can be used to create a plasma cross-linked release coating. The oligomer may be in liquid or in solid form prior to coating. Typically the oligomer has a molecular weight greater than 1000. Also, the oligomer typically has a molecular weight less than 10,000 so that the oligomer is not too volatile. An oligomer with a molecular weight greater than 10,000 typically may be too non-volatile, causing droplets to form during coating. In one embodiment, the oligomer has a molecular weight greater than 3000 and less than 7000. In another embodiment, the oligomer has a molecular weight greater than 3500 and less than 5500. Typically, the oligomer has the properties of providing a low-friction surface coating. Suitable oligomers include silicone-containing hydrocarbons, reactive silicone containing trialkoxysilanes, aromatic and aliphatic hydrocarbons, fluorochemicals and combinations thereof. For example, suitable resins include, but are not limited to, dimethylsilicone, hydrocarbon based polyether, fluorochemical polyether, ethylene teterafluoroethylene, and fluorosilicones. Fluorosilane surface chemistry, vacuum deposition, and surface fluorination may also be used to provide a release coating.

Substrate

Examples of receptor substrates include, but are not limited to, glass such as display glass, display mother glass, lighting mother glass, architectural glass, roll glass, and flexible glass. An example of flexible roll glass is the WILLOW glass product from Corning Incorporated. Other examples of receptor substrates include metals such as metal sheets and foils of copper, aluminum, zinc, stainless steel. Yet other examples of receptor substrates include sapphire, silicon, silica, and silicon carbide, semiconductor materials, and other inorganic materials.

Another example of receptor substrate includes polymers such as polyester, polycarbonate, polypropylene, polyethylene, phenolic, epoxy, acrylic, polystyrene, silicone, cellulose, polyamide, polyimide, polysilicone, polytetrafluoroethylene, polyethylenephthalate, polyvinylchloride, polycarbonate, or combinations thereof.

The receptor substrate can optionally include an adhesion promotion layer on a side of the receptor substrate to which a structured adhesive tape is applied. Examples of adhesion promotion layers can include the commercially available PRIMER 94 from 3M Co., St. Paul, Minn., as well as KR-3006A and X-40-3501 from ShinEtsu, Akron, Ohio. Examples of other suitable treatments include corona discharge, plasma discharge, flame treatment, electron beam irradiation, ultraviolet radiation, acid etching, chemical priming and combinations thereof.

An adhesion promoting layer can be implemented with any material enhancing adhesion of the transfer film to the receptor substrate without substantially adversely affecting the performance of the transfer film. Useful adhesion promoting materials useful in the disclosed articles and methods include photoresists (positive and negative), self-assembled monolayers, adhesives, silane coupling agents, and macromolecules. In some embodiments, silsesquioxanes can function as adhesion promoting layers. For example, polyvinyl silsesquioxane polymers can be used as an adhesion promoting layer. Other exemplary materials may include benzocyclobutanes, polyimides, polyamides, silicones, polysiloxanes, silicone hybrid polymers, (meth)acrylates, and other silanes or macromolecules functionalized with a wide variety of reactive groups such as epoxide, episulfide, vinyl, hydroxyl, allyloxy, (meth)acrylate, isocyanate, cyanoester, acetoxy, (meth)acrylamide, thiol, silanol, carboxylic acid, amino, vinyl ether, phenolic, aldehyde, alkyl halide, cinnamate, azide, aziridine, alkene, carbamates, imide, amide, alkyne, and any derivatives or combinations of these groups.

Other suitable additives to include in any of the layers of the multilayer adhesive tape are antioxidants, stabilizers, antiozonants and/or inhibitors to prevent premature curing during the process of storage, shipping and handling of the film. Preventing premature curing can maintain the tack required for lamination transfer in all previously mentioned embodiments. Antioxidants can prevent the formation of free radical species, which may lead to electron transfers and chain reactions such as polymerization. Antioxidants can be used to decompose such radicals. Suitable antioxidants may include, for example, antioxidants under the IRGANOX tradename. The molecular structures for antioxidants are typically hindered phenolic structures, such as 2,6-di-tert-butylphenol, 2,6-di-tert-butyl-4-methylphenol, or structures based on aromatic amines. Secondary antioxidants are also used to decompose hydroperoxide radicals, such as phosphites or phosphonites, organic sulphur containing compounds and dithiophosphonates. Typical polymerization inhibitors include quinone structures such hydroquinone, 2,5 di-tert-butyl-hydroquinone, monomethyl ether hydroquinone or catechol derivatives such as 4-tert butyl catechol. Any antioxidants, stabilizers, antiozonants and inhibitors used preferably are soluble in the layers transferred.

Without being bound by theory, it is considered that some of the described multilayer adhesive tape constructs may mitigate the time and temperature dependent stiffness behavior of the overall tape while maintaining time and temperature dependent stiffness behavior of the PSA that allows the tape to adhere to surface. A stiffness mode of interest is vertical compression. An allowable change in this stiffness can be limited to on the order of ±10%, while adhesive shear modulus may change on the order of >100% over the same time and temperature ranges. This combination of properties may also aid in the shock resistance of the described multilayer adhesive tape during its final use.

Vertical compression stiffness of the tape structure can vary between two extremes depending on the width of the tape and whether there are voids (e.g., air voids) built into the structure. For very wide tapes (i.e., width much greater than about 20 times a total thickness) the compression stiffness can depend on bulk modulus properties of the materials in the tape structure. In general, bulk modulus (pressure-dilatation behavior) values for polymeric materials are large (e.g., about 1000 MPa) and are much less sensitive to time and temperature than the shear modulus (shape-changing behavior) than can vary several orders of magnitude with time and temperature. As a result, very wide tapes may appear stiff in vertical compression and exhibit only modest time and temperature dependent behavior, even when consisting of pure, very soft PSA's and in many cases would not require using a microstructured core to mitigate time and temperature dependent shear stiffness. However, compression stiffness of narrow tapes (i.e., width less than or equal to about 20 times a total thickness) may depend strongly on shear modulus of materials within the structure since the primary mode of deformation is movement of materials in and out of the bond region. Since the shear modulus of the PSAs can vary strongly with time and temperature, inclusion of a microstructured core layer may provide a significant benefit in those cases.

Still not to be bound by theory, behavior of a structured tape can in some cases be represented simply by representing a symmetry half of the multilayer construction as a three-layered structure consisting of: A) a half-thickness section of the carrier (e.g., PET) layer; B) a layer with post-PSA composite behavior (where the "post" is a microstructural feature on an elastomeric microstructured core layer); and 3) a thin layer of PSA. An equation (1) has been constructed:

$$Mc = \frac{|G_{PSA(ref)} - G_{PSA}(t)|h_{PSA}}{G_{PSA}(t)G_{PSA(ref)}\left[\frac{h_{PSA}}{G_{PSA(ref)}} + \frac{h_{post}}{G_{post}} + \frac{h_{carrier}}{G_{carrier}}\right]}$$

where $M_C$ is a composite metric that relies on several factors including $G_{PSA}(t)$ as a total shear modulus, where $G_i$ are the shear moduli of the three component layers and $h_i$ are the effective thicknesses of the three component layers, where i is in turn each of PSA, post, and carrier. Here, a shear modulus of the PSA layer is considered to be the stiffness of the PSA as measured in simple shear. The effective thickness of that layer may depend in part on the shape of posts within the post layer. The effective shear modulus and thickness of the post layer may depend on the post shape and material that the post is made of. For example, structures consisting of closely spaced posts will likely behave almost like a solid layer of post material with an effective thickness approximately equal to the post height, whereas structures consisting of cones instead of posts will have a larger effective PSA thickness, and "post" properties will likely include much more contribution from the adhesive layer.

Following is a list of embodiments of the present disclosure.

Item 1. A multilayer adhesive tape comprising: a core layer comprising an elastomeric material, the core layer having first and second major surfaces that are opposed, parallel, and microstructured to define a plurality of recesses on the first and second major surfaces of the core layer; and first and second layers of pressure sensitive adhesive disposed on the first and second major surfaces of the core layer and at least partially filling the plurality of recesses; wherein the first and second layers of pressure sensitive adhesive are adhesively coupled to the core layer.

Item 2. The tape of item 1, wherein the core layer further comprises an internal support layer disposed between and parallel to the first and second major surfaces of the core layer.

Item 3. The tape of item 2, wherein the internal support layer comprises a thermoplastic polymer.

Item 4. The tape of any preceding item, wherein the tape has a compression creep recovery value in a range from 93% to about 95% after 1 second.

Item 5. The tape of any preceding item, wherein the tape has a shear creep recovery value in a range from 81% to about 84%.

Item 6. The tape of any preceding item, wherein the tape has a 180° peel strength value from an anodized aluminum substrate in a range from about 38 N/dm to about 57 N/dm.

Item 7. The tape of any preceding item, wherein the first and second pressure sensitive adhesives comprise a polydiorganosilane polyoxamide.

Item 8. The tape of any preceding item, wherein the first and second major surfaces of the core layer comprise a geometry that is any of continuous or elongated prisms or ridges, linear gratings, cylindrical or curved lens-shaped features, random structures, diffractive optical structures, pyramids, trapezoids, round or square shaped posts, photonic crystal structures, spherical or curved lenses, curved sided cone structures, cube corners, or combinations thereof.

Item 9. The tape of any preceding item, further comprising a release liner disposed on the first or second layers of pressure sensitive adhesive, or both.

Item 10. An article comprising the multilayer adhesive tape of any one of items 1 to 8 adhered to a first substrate by the first layer of pressure sensitive adhesive, and adhered to a second substrate by the second layer of pressure sensitive adhesive.

Item 11. A consumer electronic device comprising: a cover glass, wherein the cover glass is arranged to define at least one external surface of the consumer electronic device; and a mount disposed between the cover glass and a remaining mass of the electronic device, the mount comprising a multilayer adhesive tape according to any one of items 1 to 8.

Item 12. A multilayer adhesive tape comprising: an microstructured layer comprising an elastomeric material, the microstructured layer having first and second major surfaces that are opposed and parallel, wherein the first major surface is microstructured to define a plurality of recesses on the first major surface of the elastomeric layer; and a layer of pressure sensitive adhesive disposed on the first major surface of the microstructured layer and at least partially filling the plurality of recesses; wherein the layer of pressure sensitive adhesive is adhesively coupled to the microstructured layer.

Item 13. The tape of item 12, further comprising a carrier layer disposed on the second major surface of the microstructured layer.

Item 14. The tape of any one of items 12 to 13, wherein the tape a compression creep recovery value in a range from about 31% to about 36% after 1 second.

Item 15. The tape of any one of items 12 to 14, wherein the tape has a 180° peel strength value from an anodized aluminum substrate in a range from about 14 N/dm to about 21 N/dm.

Item 16. The tape of any one of items 12 to 15, wherein the first and second pressure sensitive adhesives comprise a polydiorganosilane polyoxamide.

Item 17. The tape of any one of items 12 to 16, wherein the microstructured layer comprise a geometry that is any of continuous or elongated prisms or ridges, linear gratings, cylindrical or curved lens-shaped features, random structures, diffractive optical structures, pyramids, trapezoids, round or square shaped posts, photonic crystal structures, spherical or curved lenses, curved sided cone structures, cube corners, or combinations thereof.

Item 18. The tape of any one of items 12 to 17, further comprising a release liner disposed on the layer of pressure sensitive adhesive.

EXAMPLES

Test Methods
180° Peel Adhesion Test

A 180° Peel adhesion test was conducted to estimate the force necessary to peel an adhesive tape from a substrate, which is indicative of its peel strength. Peel adhesion strength was measured at a 180° angle using an IMASS SP-200 slip/peel tester (available from IMASS, Inc., Accord MA) at a peel rate of 305 mm/minute (12 inches/minute). Sample tapes were laminated and attached to an anodized aluminum substrate panel. Test panels were prepared by wiping the substrate panels with a tissue wetted with 2-propanol, using heavy hand pressure to wipe the panel 8 to 10 times. This wiping procedure was repeated two more times with clean tissues wetted with solvent. The cleaned panel was allowed to air dry for 30 minutes. The adhesive tape was cut into strips measuring 1.27 cm by 20 cm (½ in. by 8 in.), and the strips were rolled down onto the cleaned panel with a 2.0 kg (4.5 lb.) rubber roller using 2 passes. The prepared samples were stored at 23° C./50% relative humidity (RH) for 72 hours before testing. Peel strength values were the average result of at least six repeated experiments. Deviations between samples were within +/−4 Newton/dm.

Compression Creep-Recovery Test

The sample under test was cut to yield disc-shaped specimen with a thickness of one layer of sample and a diameter of 8 millimeters (0.315 inch). The standard test system for compression consists of parallel metal plates, a temperature control chamber, and a control and data acquisition system. Testing was performed at 25° C.

Samples were equilibrated to 25° C. during five minutes prior to testing. Parallel plates 25 millimeters in diameter were used in a DMA Q800 Dynamic Mechanical Analysis instrument (Q800 DMA, Texas Instruments, New Castle, Del. USA). A zero gap between the upper and lower test plates was established and an initial pressure of 10 MPa applied to the sample to provide good contact between the sample and the plates before testing. An instantaneous compressive stress was applied and held for six seconds to the sample and the resultant strain generated was recorded. The stress was then reduced to zero and the recoverable strain measured as a function of time at a constant temperature. Stress levels were adjusted to assure that strain levels were under 10% strain. The strain recovery after one second after the load has been removed, relative to the maximum strain accomplished after six seconds of stress, is reported as the percentage compressive creep-recovery.

Shear Creep-Recovery Test

The sample under test was cut to yield disc-shaped specimen with a thickness of one layer of sample and a diameter of 8 millimeters (0.315 inch). The standard test system for shear consists of parallel metal plates, a temperature control chamber, and a control and data acquisition system. Testing was performed at 25° C.

Samples were equilibrated to 25° C. during five minutes prior to testing. Parallel plates 8 millimeters in diameter were used in a rheometer (TA DHR-2, Texas Instruments, New Castle, Del. USA). A zero gap between the upper and lower test plates was established and an initial pressure of 1000 grams applied to the sample to provide good contact between the sample and the plates before testing. An instantaneous shear stress was applied and held for five seconds to the sample and the resultant strain generated at that stress was recorded. The stress was then dropped to zero and the recoverable strain measured as a function of time at a constant temperature. Stress levels were adjusted to assure that strain levels were under 10% strain. The strain recovery after one second after the load has been removed, relative to the maximum strain accomplished after five seconds of stress, is reported as the percentage compressive creep-recovery.

Two-Side Tie-Layer Carrier Construction
Materials:

| Designation | Description and Source |
| --- | --- |
| SR399 | dipentaerythritol pentaacrylate, is commercially available for Sartomer, Exton, PA |
| IRGCUR184 | a photo initiator, 1-hydroxy-cyclohexyl-ketone, is commercial available from Ciba Specialty Chemicals, Tarrytown, NY |
| CAB-O-SPERSE® PG 022 | aqueous dispersion of fumed silica, available from Cabot Industries, Boston, MA |
| TEGRAD 2250 | silicone acrylate oligmer and is commercially available from Evonik Industries AG, Germany |

A 200 g sample of CAB-O-SPERSE® PG 022 fumed silica dispersion (20 wt. % solids) was charged to a 1 L 3-neck flask equipped with a condenser, stir bar, stir plate, temperature controller and heating mantle. To this dispersion, a premix of 6.16 g A174 (97%, 3-methacryloxypropyltrimethoxysilane, Alfa Aesar Stock #A17714) and 300 g 1-methoxy-2-propanol was added with stirring. The A174/1-methoxy-2-propanol premix beaker was rinsed with two 25 g aliquots of 1-methoxy-2-propanol. The rinses were added to the batch. The batch was heated to 80° C. and held for approximately 16 hours with stirring. The resulting mixture was low viscosity, hazy, translucent dispersion. The batch was then cooled to room temperature. The batch was transferred to a 1 L one-neck distillation flask. The water was removed from the batch by alternate vacuum distillation, using a Rotavapor, and addition of 200 g 1-methoxy-2-propanol. The batch was further concentrated by vacuum distillation to result in a low viscosity, hazy, translucent dispersion with 30.9 wt. % solids.

A tie coating formulation was prepared by mixing A-174 modified fumed silica, resin binders, photo initiator, wetting agent and solvent together. The mixtures were further mixed for 10 min while stirring. The coating composition consisted of 23.05 wt % NTI Fumed Silica, 2.37 wt % SR399, 0.38 wt % TEGO RAD 2250, 73.80 wt % methyl ethyl ketone, and 0.38 wt % IRGACURE 184.

The tie coating formulation described above was coated on 28 micrometer poly(ethyleneterephthalate) ("PET") substrate (from 3M Company, St. Paul, Minn. USA) using the coating method described below:

The coating solution was syringe-pumped at 15 mL/min into a 20.4 cm (8-inch) wide slot-type coating die. The slot coating die uniformly distributed a 20.4 cm wide coating onto a substrate moving at 20 ft/min (6.1 m/min.). The resulting films were then dried by transporting the coating to a drying oven operating at 77° C. for about 30 seconds. Next, the dried coating was post-cured using a Fusion System Model 1300P configured with an H-bulb (available from Fusion UV Systems, Gaithersburg Md.). The UV Fusion chamber was supplied with a flow of nitrogen that resulted in an oxygen concentration of approximately 50 ppm in the chamber.

The coating/drying/curing procedure was repeated on the second side of the web, creating a two side tie-layer PET substrate.

Master Tool 1 Construction

A master tool 1 was prepared as described in U.S. Pat. No. 6,843,571 (Sewall). Three groove sets, which formed truncated microprisms having a height of approximately 92 micrometers (0.0036 inch), were cut onto a machinable metal using a high precision diamond tool such as "K&Y Diamond," manufactured and sold by Mooers of New York, U.S.A. The microprisms had isosceles base triangles formed as matched pairs with 56.5, 56.5 and 67 degrees included angles, such as generally described in U.S. Pat. No. 5,138,488 (Szczech). After the mold is cut, it then serves as a master mold for the manufacture of negative molds. Duplicates of the master mold can be made from the negative molds by electroforming or other well-known techniques for mold duplication.

Master Tool 2 Construction

A master tool 2 was prepared as per master tool 1, with the dimensions described in U.S. Pat. No. 4,895,428 (Nelson).

Preparatory Example 1: Preparation of Coating Solution Containing Silicone Polyoxamide Elastomer A silicone polyoxamide elastomer was prepared in two steps. In the first step, an α,ω-bis(aminopropyl)polydimethylsiloxane diamine with a molecular weight of 25,000 grams/mole was capped with diethyl oxalate to provide an α,ω-oxamido oxalate ester capped precursor. This step was completed by following the general procedure of Preparative Example 1 in U.S. Pat. No. 7,371,464 (Sherman et al.). The diethyl oxalate was used in a molar excess to the diamine to provide the an α,ω-oxamido oxalate ester capped precursor. This precursor was chain-extended into the silicone poly- oxamide elastomer using ethylene diamine following the general procedure of Preparative Example 3 in U.S. Pat. No. 7,371,464 (Sherman et al.) with the exception that the above α,ω-oxamido oxalate ester capped precursor was used instead of a mixture of precursors and the reaction time was four days. The mole ratio of precursor to ethylene diamine was 1 to 1. The resulting silicone polyoxamide elastomer was used neat without determining hardness.

The silicone polyoxamide elastomer was then combined with a functional MQ resin procured from GE under the trade designation SR-545 to create a silicone polyoxamide adhesive coating solution. The silicone polyoxamide elastomer and SR-545 functional MQ resin were combined in a 50/50 weight ratio. A coating solution of this combination of silicone polyoxamide elastomer and SR-545 was approximately 35 wt. % total solids in a 60/20/20 wt. % blend of ethyl acetate/isopropanol/toluene. The coating solution exhibited a viscosity of approximately 7600 cP.

Comparative Example A—Adhesive Only

The silicone polyoxamide adhesive coating solution described above was applied to the release side of a release liner MDO-7 (Siliconature USA, LLC, Chicago Ill., USA) with a doctor blade set to 203.2 micrometer gap. The construction was placed in a convection solvent rated oven at 50° C. for 10 minutes. Four layers of the dried adhesive were laminated together using a hand roller to create a final adhesive monolith four times the thickness of the dried coating. The adhesive side of the construction was laminated to the release side of a release liner MDO-7 (Siliconature USA, LLC, Chicago Ill., USA) using a silicone hand roller.

The sample was cross sectioned with a razor blade, and imaged on edge using a scanning electron microscope ("SEM"). Dimensions were determined from the analysis of these images. The samples were tested for 180° Peel Adhesion, Compression Creep-recovery, and Shear Creep-recovery according to the test methods described earlier. The results were as summarized in Table 1.

Comparative Example B—Adhesive on Unstructured Film Layer

Five grams of CONTRATHERM C25 unfilled silicone elastomer part A (commercially available from Advanced Insulation, Houston, Tex. USA) was measured into a container, and 0.5 grams of silicone elastomer part B was added. The two parts were mixed in a THINKYMIXER (Thinky Corporation, Laguna Hills, Calif. USA) for 2 minutes, followed by 1 minute of defoaming. The uncured elastomer mixture was coated onto one side of the two side tie-layer PET substrate described above with a gap of 84 micrometers. The sample was cured in an oven at 50° C. for 1 hour. The procedure was repeated on the opposite side of the film to create an unstructured elastomer on both sides of the PET carrier.

The adhesive formulation described previously was applied to one side of the two sided elastomer with a doctor blade set to 178 micrometer gap. The construction was placed in a convection solvent rated oven at 50° C. for 10 minutes. The sample was removed from the oven and the adhesive side of the construction laminated to the release side of a release liner MDO-7 (Siliconature USA, LLC, Chicago Ill., USA) using a silicone hand roller.

The adhesive formulation described previously was applied to the uncoated side of the two sided structured elastomer with a doctor blade set to 178 micrometer gap.

The construction was placed in a convection solvent rated oven at 50° C. for 10 minutes. The adhesive side of the construction was laminated to the release side of a release liner MDO-7 using a silicone hand roller, creating a multilayer adhesive tape construction.

The sample was cross sectioned with a razor blade, and imaged on edge using a scanning electron microscope.

Figure 4:
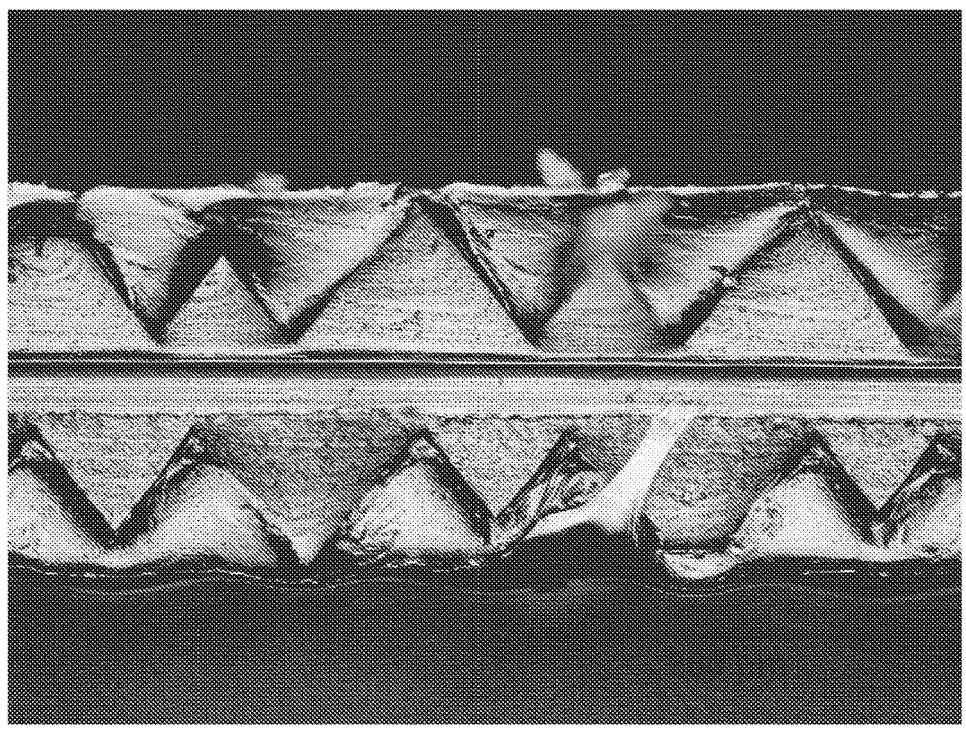
FIG. 4 is a digital image of a cross-sectioned multilayer adhesive tape of the present disclosure.

The sample was cross sectioned with a razor blade, and imaged on edge using a scanning electron microscope (see FIG. 4). Dimensions were determined from the analysis of these images. The samples were tested for 180° Peel Adhesion, compression creep-recovery, and shear creep-recovery as described earlier. The results were as summarized in Table 1.

TABLE 1

| Example | Maximum PSA height - Side A (micrometers) | Structure height - Side A (micrometers) | Carrier thickness (micrometers) | Structure height - Side B (micrometers) | Maximum PSA height - Side B (micrometers) | Tape Total Construction Height (micrometers) | Compressive Creep Recovery (%) after 1 s | Shear Creep Recovery (%) after 1 s | 180° Peel Force from anodized Al (N/dm) |
|---|---|---|---|---|---|---|---|---|---|
| Comparative A | | | | | | 260 | 77.7 | 69.0 | 91.2 |
| Comparative B | 60 | 85 | 28 | 85 | 60 | 318 | 89.1 | 84.0 | 120 |
| Example 1 | 113 | 105 | 28 | 105 | 113 | 254 | 95.1 | 81.0 | 38 |
| Example 2 | 113 | 105 | 28 | 105 | 125 | 276 | 93.9 | 83.0 | 24 |
| Example 3 | 113 | 105 | 28 | 105 | 127 | 268 | 93.1 | 84.0 | 56.8 |

Dimensions were determined from the analysis of these images. The samples were tested for 180° Peel Adhesion, compression creep-recovery, and shear creep-recovery as described earlier. The results were as summarized in Table 1.

Example 1

Five grams of CONTRATHERM C25 unfilled silicone elastomer part A (commercially available from Advanced Insulation, Houston, Tex. USA) was measured into a container, and 0.5 grams of CONTRATHERM C25 silicone elastomer part B was added. The two parts were mixed in a Thinkymixer (Thinky Corporation, Laguna Hills, Calif. USA) for 2 minutes, followed by 1 minute of defoaming. The uncured elastomer mixture was spread onto Master Tool 1 described above with a plastic scraper. The coated tool was placed into a vacuum chamber (VWR S/P Model 1450M, VWR International, Radnor, Pa. USA) and brought to 28 in Hg (95 kPa) for 5 minutes to remove the air trapped between the tool and the elastomer. The two side tie-layer PET substrate described above was then laminated to the uncured elastomer using a hand roller. The construction was then passed through a desktop laminator (GBC Catena 35, GBC Document Finishing, Lake Zurich, Ill. USA) set to medium pressure. The laminated construction was then held on a hotplate at 50° C. for one hour to cure.

The layered construction was separated from the tool, and the entire process repeated to create structured elastomer on both sides of the PET carrier.

The adhesive formulation described previously was applied to one side (Side A) of the two-sided structured elastomer with a doctor blade set to zero gap. The construction was placed in a convection solvent rated oven at 50° C. for 10 minutes. The sample was removed from the oven and the adhesive side of the construction laminated to the release side of a release liner MDO-7 (Siliconature USA, LLC, Chicago Ill., USA) using a silicone hand roller.

The adhesive formulation described previously was applied to the uncoated side of the two sided structured elastomer (side B) with a doctor blade set to zero gap. The construction was placed in a convection solvent rated oven at 50° C. for 10 minutes. The adhesive side of the construction was laminated to the release side of a release liner MDO-7 using a silicone hand roller, creating a multilayer adhesive tape construction.

Example 2

All procedures were followed as to Example 1, except the adhesive was coated onto the structured film with a gap of 0.008 inches on side A and 0.011 inches on side B, between the uppermost structure and the bottom of the doctor blade.

Figure 5:
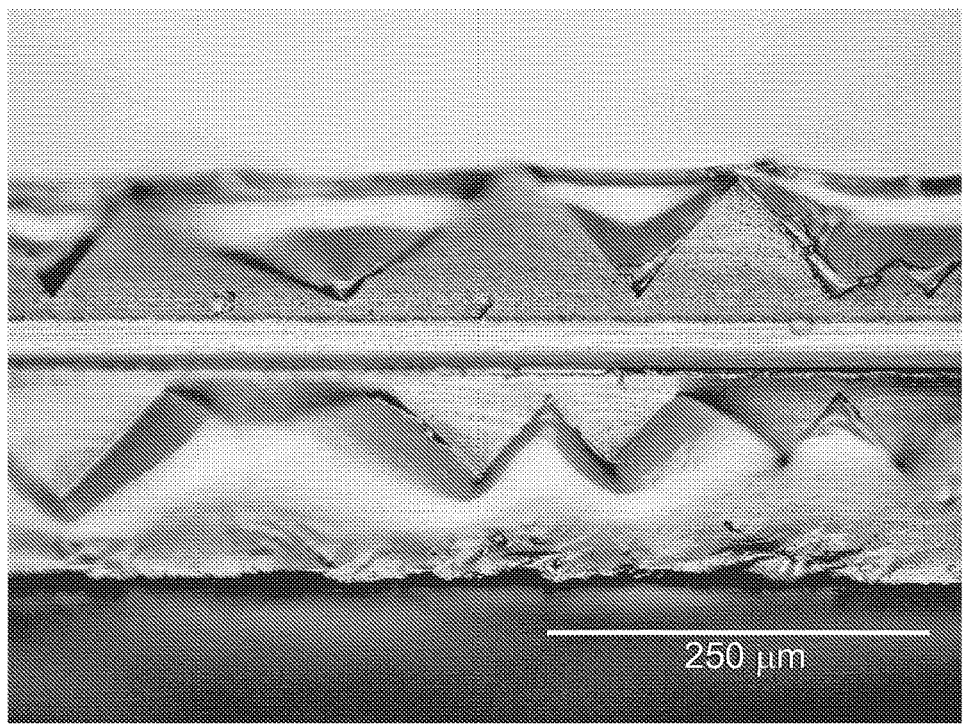
FIG. 5 is a digital image of a cross-sectioned multilayer adhesive tape of the present disclosure.

The sample was cross sectioned with a razor blade, and imaged on edge using a scanning electron microscope (see FIG. 5). Dimensions were determined from the analysis of these images. The samples were tested for 180° Peel Adhesion, compression creep-recovery, and shear creep-recovery as described earlier. The results were as summarized in Table 1.

Example 3

All procedures were followed as to Example 1, except the adhesive was coated onto the structured film with a gap of 203 micrometers on side A and 279 micrometers on side B, between the uppermost structure and the bottom of the doctor blade.

Figure 6:
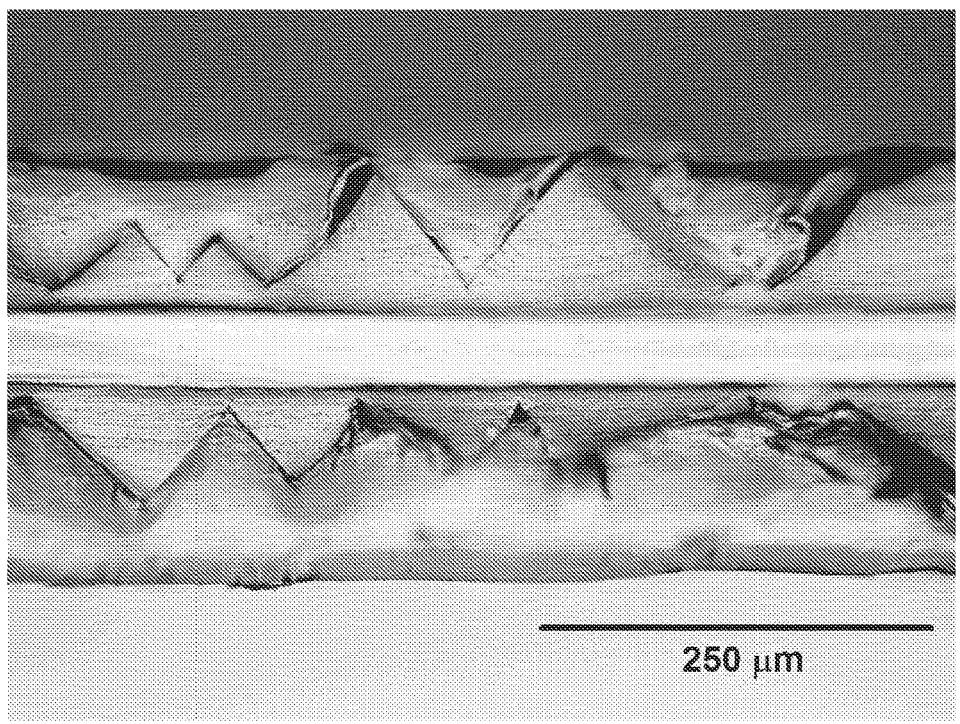
FIG. 6 is a digital image of a cross-sectioned multilayer adhesive tape of the present disclosure.

The sample was cross sectioned with a razor blade, and imaged on edge using a scanning electron microscope (see FIG. 6). Dimensions were determined from the analysis of these images. The samples were tested for 180° Peel Adhesion, compression creep-recovery, and shear creep-recovery as described earlier. The results were as summarized in Table 1.

One-Sided Tie-Layer Carrier Construction

Example 4

All procedures were followed as to Example 1, except Master Tool 2 was used, and the adhesive was coated onto the structured film with a gap of 304 micrometers between the uppermost structure and the bottom of the doctor blade.

Figure 7:
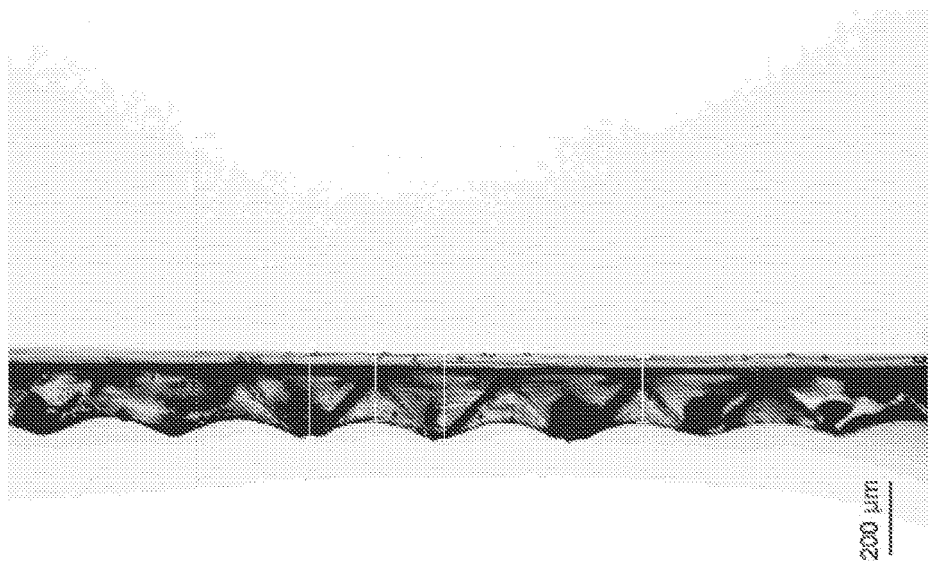
FIG. 7 is a digital image of a cross-sectioned multilayer adhesive tape of the present disclosure.

The sample was cross sectioned with a razor blade, and imaged on edge using a scanning electron microscope (see FIG. 7). Dimensions were determined from the analysis of these images. The samples were tested for 180° Peel Adhesion, compression creep-recovery, and shear creep-recovery as described earlier. The results were as summarized in Table 2.

Example 5

All procedures were followed as to Example 1, except Master Tool 2 was used, and the adhesive was coated onto the structured film with a gap of 356 micrometers between the uppermost structure and the bottom of the doctor blade.

Figure 8:
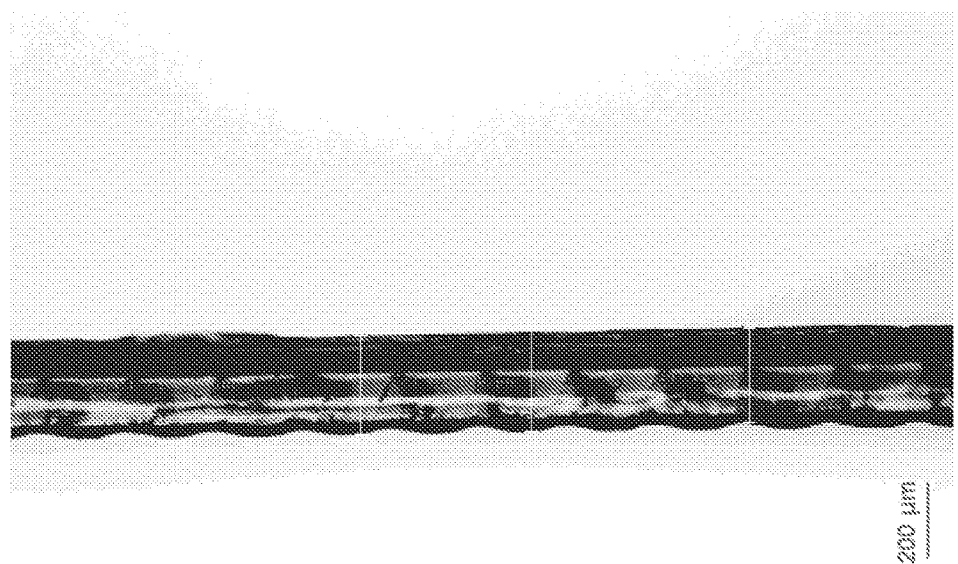
FIG. 8 is a digital image of a cross-sectioned multilayer adhesive tape of the present disclosure.

The sample was cross sectioned with a razor blade, and imaged on edge using a scanning electron microscope (see FIG. 8). Dimensions were determined from the analysis of these images. The samples were tested for 180° Peel Adhesion, compression creep-recovery, and shear creep-recovery as described earlier. The results were as summarized in Table 2.

TABLE 2

| Example | Maximum PSA height (micrometers) | Minimum PSA height (micrometers) | Structure height (micrometers) | Carrier thickness (micrometers) | Total Tape Construction Height (micrometers) | Compressive Creep Recovery (%) after 1 s | 180° Peel Force from anodized Al (N/dm) |
|---|---|---|---|---|---|---|---|
| Example 4 | 200 | 152 | 200 | 28 | 228 | 36.0 | 14 |
| Example 5 | 232 | 214 | 200 | 28 | 260 | 31.7 | 21 |

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A multilayer adhesive tape comprising:
a core layer comprising an elastomeric material, the core layer having first and second major surfaces that are opposed, and microstructured to define a plurality of recesses on the first and second major surfaces of the core layer, each recess comprising a bottom, wherein the microstructured first and second major surfaces have structures that are periodic in two dimensions with nearest neighbor features spaced equally in two different directions along each of the first and second major surfaces, the structures comprising cylindrical or curved lens-shaped features, diffractive optical structures, pyramids, trapezoids, round or square shaped posts, photonic crystal structures, spherical or curved lenses, curved sided cone structures, cube corners, or combinations thereof; and
first and second layers of pressure sensitive adhesive coated onto the microstructured first and second major surfaces of the core layer and at least partially filling the plurality of recesses, such that the pressure sensitive adhesive of the first and second layers has, associated with least one recess, a first thickness extending from the bottom of the recess to a minimum pressure sensitive adhesive surface level and a second thickness extending from a maximal structure surface level to a maximal pressure sensitive adhesive surface level, the first thickness being greater than the second thickness;
wherein the first and second layers of pressure sensitive adhesive are adhesively coupled to the core layer.

2. The tape of claim 1, wherein the core layer further comprises an internal support layer disposed between the first and second major surfaces of the core layer.

3. The tape of claim 2, wherein the internal support layer comprises a thermoplastic polymer.

4. The tape of claim 1, wherein the first and second pressure sensitive adhesives comprise a polydiorganosilane polyoxamide.

5. The tape of claim 1, further comprising a release liner disposed on the first or second layers of pressure sensitive adhesive, or both.

6. An article comprising the multilayer adhesive tape of claim 1 adhered to a first substrate by the first layer of pressure sensitive adhesive, and adhered to a second substrate by the second layer of pressure sensitive adhesive.

7. A consumer electronic device comprising:
a cover glass, wherein the cover glass is arranged to define at least one external surface of the consumer electronic device; and
a mount disposed between the cover glass and a remaining mass of the electronic device, the mount comprising a multilayer adhesive tape according to claim 1.

8. A multilayer adhesive tape comprising:
a microstructured layer comprising an elastomeric material, the microstructured layer having opposed first and second major surfaces, wherein the first major surface is microstructured to define a plurality of recesses on the first major surface, each recess comprising a bottom, wherein the microstructured first major surface has structures that are periodic in two dimensions with nearest neighbor features spaced equally in two different directions along the first major surface, the structures comprising cylindrical or curved lens-shaped features, diffractive optical structures, pyramids, trapezoids, round or square shaped posts, photonic crystal structures, spherical or curved lenses, curved sided cone structures, cube corners, or combinations thereof; and
a layer of pressure sensitive adhesive coated onto the microstructured first major surface of the microstructured layer and at least partially filling the plurality of recesses, such that the pressure sensitive adhesive has, associated with least one recess, a first thickness from the bottom of the recess to a minimum pressure sensitive adhesive surface level and a second thickness extending from a maximal structure surface level to a maximal pressure sensitive adhesive surface level, the first thickness being greater than the second thickness;

wherein the layer of pressure sensitive adhesive is adhesively coupled to the microstructured layer.

9. The tape of claim 8, further comprising a carrier layer disposed on the second major surface of the microstructured layer.

10. The tape of claim 8, wherein the pressure sensitive adhesive comprises a polydiorganosilane polyoxamide.

11. The tape of claim 8, further comprising a release liner disposed on the layer of pressure sensitive adhesive.

12. A multilayer adhesive tape comprising:

a microstructured layer comprising an elastomeric material and a microstructured first major surface to define a plurality of recesses on the first major surface, each recess extending from a bottom of the recess to a maximal structure surface level, wherein the microstructured first major surface has structures that are periodic in two dimensions with nearest neighbor features spaced equally in two different directions along the first major surface, the structures comprising cylindrical or curved lens-shaped features, diffractive optical structures, pyramids, trapezoids, round or square shaped posts, photonic crystal structures, spherical or curved lenses, curved sided cone structures, cube corners, or combinations thereof; and a layer of pressure sensitive adhesive coated onto the microstructured first major surface and at least partially filling the plurality of recesses, the layer of pressure sensitive adhesive having a surface defining a minimum pressure sensitive adhesive surface level and a maximal pressure sensitive adhesive surface level, and the layer of pressure sensitive adhesive having a first thickness extending from the bottom of at least one recess to the minimum pressure sensitive adhesive surface level and a second thickness extending from the maximal structure surface level to the maximal pressure sensitive adhesive surface level, the first thickness being greater than the second thickness;

wherein the layer of pressure sensitive adhesive is adhesively coupled to the microstructured layer.

* * * * *